United States Patent [19]

Shimomura et al.

[11] Patent Number: 4,864,455

[45] Date of Patent: Sep. 5, 1989

[54] ARRESTER DISCONNECTING DEVICE

[75] Inventors: Tetsuro Shimomura; Katsufusa Tanaka; Mikio Mochizuki, all of Hyogo, Japan

[73] Assignee: Mitsubishi Denki Kabushiki Kaisha, Tokyo, Japan

[21] Appl. No.: 281,348

[22] Filed: Dec. 8, 1988

[30] Foreign Application Priority Data

Feb. 16, 1988 [JP] Japan .................................. 63-34430

[51] Int. Cl.[4] .............................................. H02H 9/04

[52] U.S. Cl. .................................... 361/125; 361/132; 361/117; 337/31; 337/34

[58] Field of Search ............... 361/117, 124, 125, 126, 361/127, 131, 132, 136; 337/28, 31, 32, 33, 34

[56] References Cited

U.S. PATENT DOCUMENTS 2,142,188 1/1939 Gaston ................................ 361/132
2,504,438 4/1950 Mc Farlin ........................... 361/125
3,064,164 11/1962 Osmundsen et al. ............... 361/125
4,308,566 12/1981 Imataki et al. ....................... 361/132
4,774,622 9/1988 Shirakawa et al. ................. 361/132
4,788,622 11/1988 Cinquin .............................. 361/127

*Primary Examiner*—A. D. Pellinen
*Assistant Examiner*—H. L. Williams
*Attorney, Agent, or Firm*—Oblon, Spivak, McClelland, Maier & Neustadt

[57] ABSTRACT

A surge arrester disconnecting device which includes a fixed electrode, a movable electrode, and a latch device for holding the two electrodes in engagement. A trigger device, associated with a first spring and a fusible wire stretched between the movable electrode and the trigger device, releases the latch when the fusible wire is melted by continuation current therethrough. Upon trigger actuation and latch release, a second spring assists in the non-explosive disconnection of the movable electrode.

4 Claims, 3 Drawing Sheets

ARRESTER DISCONNECTING DEVICE

BACKGROUND OF THE INVENTION

The present invention relates to an arrester disconnecting device for disconnecting an arrester from an electric circuit when it malfunctions.

FIGS. 4 and 5 show a conventional surge arrester disconnecting device such as disclosed in Japanese Patent Application Laid-Open No. 95284/1980. In these figures, an arrester 1, a gap portion 4 composed of a reactor 2 and a gap 3 and a disconnecting portion 7 composed of a fusible wire 5 and a breaker portion 6 are connected in series through a connecting metal part 8 with a power transmission cable 9. The cable 9 is separately supported by a suspending insulator 10. FIG. 6 is an equivalent circuit of this construction with the arrester 1 and the suspending insulator 10 being shown as electrostatic capacitances.

In FIGS. 4 to 6, when the arrester 1 is operated by high frequency lightning impulse, an impedance of the reactor 2 becomes high, so that surge current does not flow through the fusible wire 5 and thus a voltage is applied across the gap 3. Therefore, lightning impulse current flows through the gap 3, a shunt 11 to the connecting metal, part 8. On the other hand, when the arrester 1 is in an abnormal condition, a grounding current of commercial frequency may flow. However, since the commercial frequency is low, the impedance of the reactor 2 is low enough and thus the grounding current flows through the reactor 2 to the fusible wire 5. When the fusible wire 5 is melted down by the grounding current, an arc is generated in that portion causing pressure in a space inside an insulating tube 12 of the disconnecting portion 7 to be high. With such increase of inner pressure, the insulating tube 12 is broken, resulting in a rapid disconnection of the arrester 1 from the power transmission cable 9.

The conventional arrester disconnecting device includes an explosive destruction of a portion thereof by increase of inner pressure of an insulating tube due to arc produced after a fusible wire is melted down, which is dangerous.

SUMMARY OF THE INVENTION

An object of the present invention is to provide a surge arrester disconnecting device which is insensitive to lightning surge current and switching surge current and is operable with respect to an a.c. current during the arrester malfunctions to disconnect it from an electric circuit.

In a surge arrester disconnecting device according to the present invention, a gap having a predetermined size is provided between a fixed electrode and a movable electrode, a fusible wire is connected between a movable electrode and a trigger provided opposingly thereto, the trigger is biased by a first spring in a direction opposite to the movable electrode and one ends of a pair of latch members of a latch rotatably supported by the fixed electrode are engaged with the movable electrode and the other ends thereof are engaged with the trigger so that a second spring is compressed in a direction such that the movable electrode will be separated from the fixed electrode when the fusible wire is melted down and the latch is disengaged from the trigger and then the one end of the latch is disengaged from the movable electrode to relieve the second spring.

The arrester disconnecting device in this invention detects a fault current thereof by means of the fusible wire connected in series with the reactor and, when the fusible wire is melted down, the engagement of the trigger with the latch is broken by the first spring for providing a tension to the fusible wire and then the engagement of the latch with the movable electrode is broken by the second spring which stores energy necessary to perform the disconnection so that the movable electrode is made free to move in the direction opposite to the fixed electrode to thereby open the electric circuit between the power transmission cable side and the arrester side.

DETAILED DESCRIPTION OF THE PREFERRED EMBODIMENT

Figure 3:
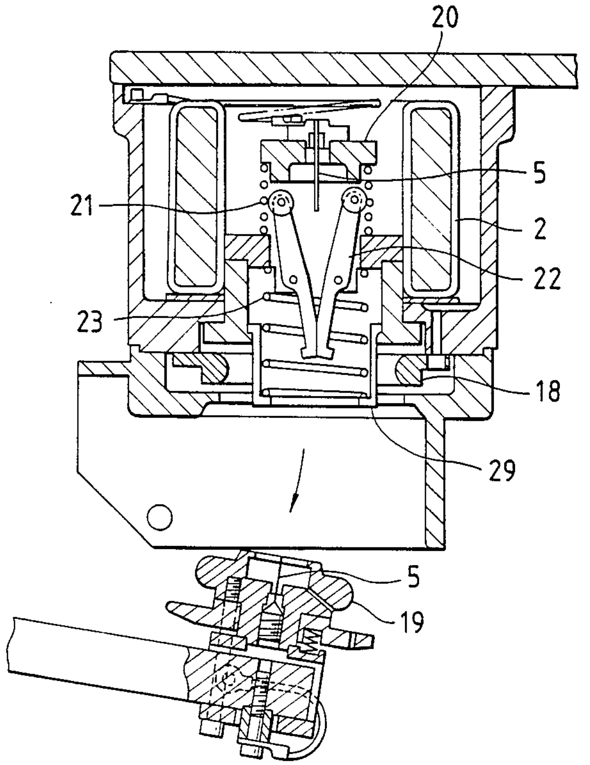
FIG. 3 illustrates an operation of the device shown in FIG. 2.

An embodiment of the present invention will be described with reference to FIGS. 1 to 3.

Figure 1:
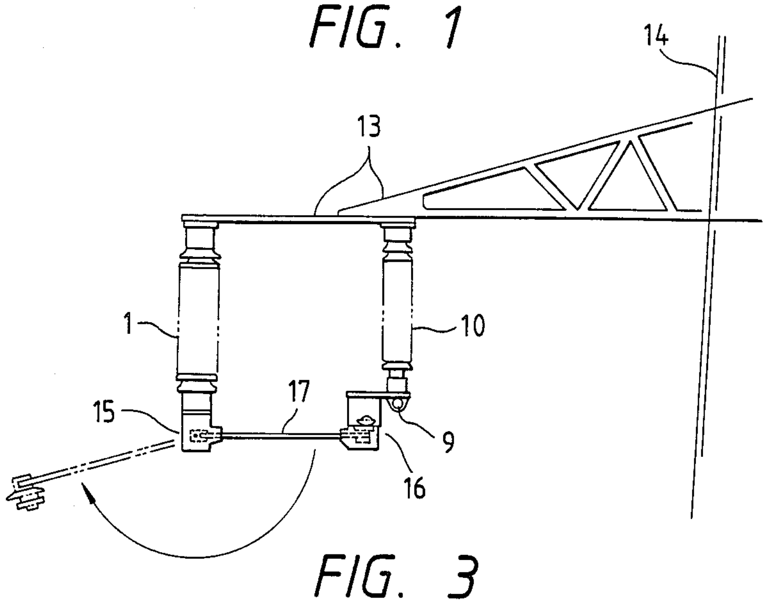
FIG. 1 is a front view of a disconnecting device according to an embodiment of the present invention when applied to an arrester.

FIG. 1 is a front view of the embodiment mounted with respect to a surge arrester, in which a power transmission tower 14 has a horizontal arm 13 to which a power insulator 10 is connected at one end thereof and suspended therefrom. The insulator 10 supports at the other end thereof a power transmission line 9.

One end of the arrester 1 is also connected fixedly to the same arm 13 with a predetermined distance with respect to the insulator 10. The other end of the arrester 1 supports one end of a movable conductor 17 rotatably through a support structure 15 which constitutes a disconnecting device of the present invention. The other end of the movable conductor 17 is coupled to a disconnecting mechanism 16 mounted to a lower end of the suspension insulator 10 in electrical connection with the power line 9. That is, when there is a discharge from cloud to the power line 9, lightning current flows through the disconnecting mechanism 16, the movable conductor 17, the support structure 15, the arrester 1 and the arm 13 to the power transmission tower 14 and then to ground. On the other hand, when the arrester 1 malfunctions and grounding current starts to flow, the disconnecting mechanism is actuated to disconnect a connecting portion of the movable conductor 17 and rotate it to a position shown by a chain line.

Figure 2:
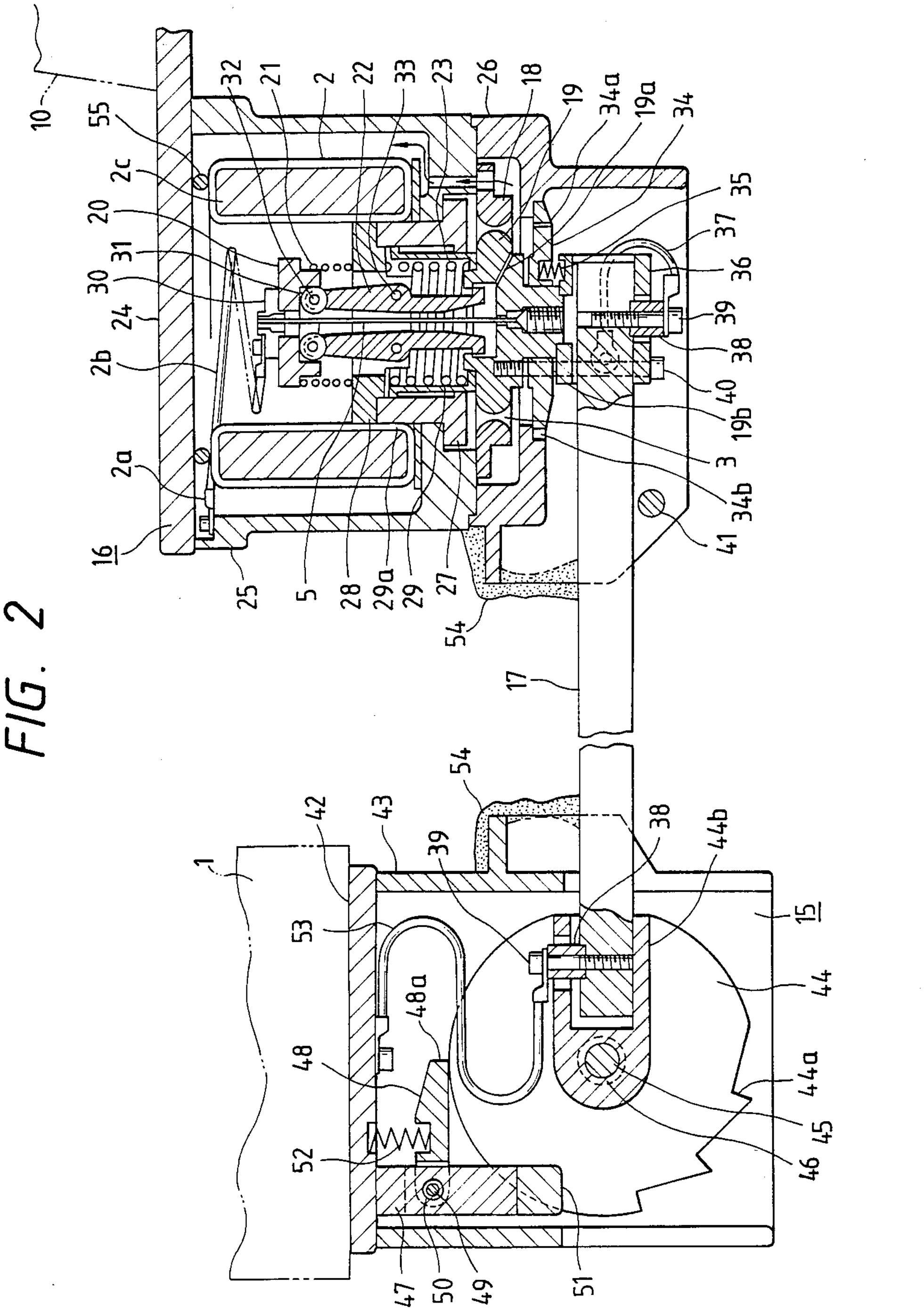
FIG. 2 is a cross sectional view of the disconnecting device for an arrester, according to an embodiment of the present invention.
Figure 4:
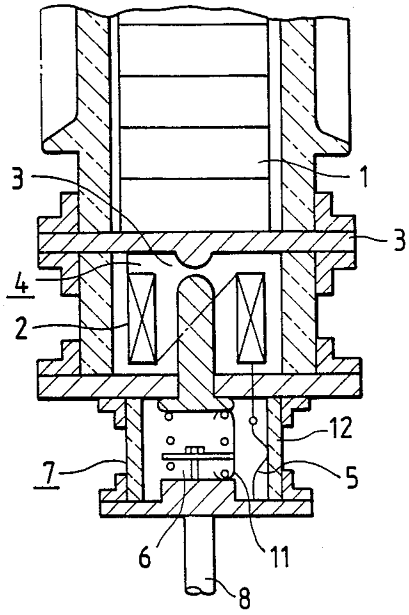
FIG. 4 PRIOR ART
FIGS. 4 to 6 show a construction of a conventional disconnecting device.
Figure 5:
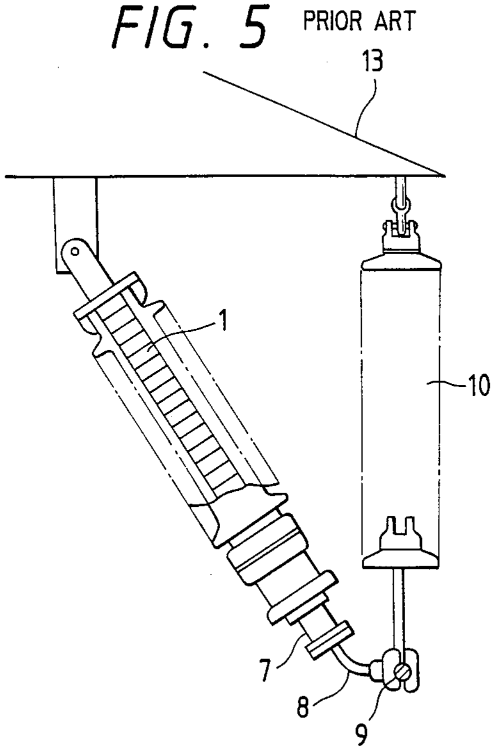
FIG. 5 PRIOR ART
Figure 6:
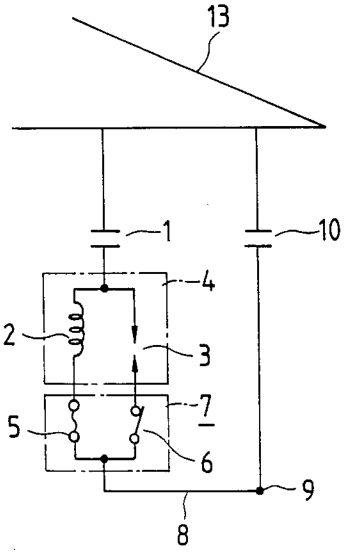
FIG. 6 PRIOR ART

In FIG. 2, a left side portion shown in cross section corresponds to the support structure 15 of the movable conductor 17 and a right side portion shown in cross section corresponds to the disconnecting mechanism 16. An end of a mounting plate 24 is fixed to a lower portion of the suspended insulator 10 and a cylindrical case 25 is mounted on the other end thereof as a protective member against rain.

The reactor 2 formed by a toroidal coil wound on a non-magnetic cylindrical core 2*c* is fixed in an interior of the case 25 defined by an outer periphery of a cylinder 27 and an O-ring 55.

A lead wire 2*a* of the reactor 2 is connected to the case 25 and the other lead wire 2*b* thereof is connected to a terminal base 30 mounted on a trigger 20 formed of insulating material.

One end of the fusible wire 5 is fixedly secured to the terminal base 30 and the other end thereof is fixedly secured to a movable electrode 19. The fusible wire 5 is biased by a first spring 21 against a force acting thereon to disengage the trigger 20 from rollers 31 mounted on respective one ends of a pair of latch members constituting a latch 22 by pins 32. That is, a tension is always applied to the fusible wire 5. In order to prevent the creep phenomenon from occuring in the wire, the fusible wire in this embodiment comprises a stainless steel wire suitable for spring.

The cylinder 27 formed of insulating material is fixed in the case and a latch support 28 supporting center portions of the latch members of the latch 22 rotatably by hinge pins 33 is mounted on an end portion thereof. A piston 29 is slidably received in the cylinder 27, which is movable by a second spring 23 for providing a disconnecting energy.

The piston 29 takes in the form of ring having a generally Z-shaped cross section and, when the second spring 23 discharges its energy, it moves by a constant distance to a step portion of the cylinder 27 by which it is prevented from being moved further. An end of the piston 29 is in contact with the movable electrode 19 and an inner periphery thereof is fitted on a protruded root portion of a latch engagement portion of the movable electrode 19 to position the movable electrode 19.

In the shown position of the movable electrode 19, a discharge gap 3 of a predetermined size is provided between an outer periphery of a discharge portion of the movable electrode and an inner periphery of the fixed electrode 18. In a lower portion of the latch engagement portion of the movable electrode 19, a hole 19*a* is formed for drain of condensed water therein, drained water being discharged through a drain hole 34*a* formed in a movable cover 34 of insulating material.

The movable cover 34 in the form of disc is mounted between the movable electrode 19 and a connecting metal part 36 such that it is movable along a shaft portion 19*b* of the movable electrode 19 passing therethrough. An outer periphery of the movable cover 34 is fitted in a stepped hole of a cover 26 mounted on the case 25 and is formed with notches 34*b* therealong.

A compression spring 35 is provided for urging the movable cover 34 to the cover 26 to close the stepped hole thereof. The connecting metal part 36 mounted on the movable electrode 19 by bolts 40 is formed with a hole for inserting one side of the movable conductor 17 in the form of rod with a large annular gap thereabout and an insertion hole for a bushing 38 for preventing the movable conductor 17 from dropping out.

A flexible cable 37 is connected electrically at one end thereof to the connecting metal part and at the other end through the bushing 38 to the movable conductor 17 by a bolt 39. The other end of the movable conductor 17 is inserted into an idle hole formed in a rachet wheel 44 and prevented from dropping out by the bushing 38. The bushing 38 is mounted, together with one end of a flexible cable 53, on the movable conductor 17 by the bolt 39 and the other end of the flexible cable 53 is connected to a mounting plate 42. The rachet wheel 44 is mounted on a casing 43 by a shaft 45 rotatably with respect thereto. The shaft 45 is supported by an electrically insulated bearing 46.

A mounting base 47 is fixed to the mounting plate 42 and supports a nail 48 rotatably by a pin 49 and an insulated bearing 50. The mounting base has a lower end on which a damper 51 is mounted, as shown.

A spring 52 is provided to urge the nail 48 to an outer periphery of the rachet wheel 44. The mounting plate 42 is mounted on a lower portion of the arrester 1 and capable of flowing electric current. A reference numeral 54 shows portions frozen which condition occurs frequently on a power transmission tower settled in mountain side. In order to avoid malfunction of the device due to ice, portions of the device which are exposed to atmosphere and in which the fixed portion and the movable portion are closely positioned are coated or painted with anti-frozen agent.

In this embodiment, the movable conductor 17 is covered by a heat shrinkable tube of colored teflon material. A safety pin 41 is provided to restrict a movement of the movable conductor 17 during mounting the present device on the arm 13 of the transmission tower so that a worker is protected against an accidental actuation of the disconnecting device thereof. The safety pin 41 is removed once the mounting is completed.

An operation of the present invention will be described hereinafter. In FIGS. 1 to 3, when the arrester 1 is operated by high frequency lightning impulse, surge current which tends to flow from the power transmission line 9 through the mounting plate 24 and the casing 25 causes a voltage across the gap 3 since the impedance of the reactor 2 connected to the casing 25 is high and so there is no current flows through the fusible wire 5 connected in series with the reactor 2. Therefore, surge current produces a spark discharge in the gap 3 between the fixed electrode 18 connected to the casing 25 and the movable electrode 19 and flows from the connecting metal part 36 through the cable 37, the movable conductor 17, the cable 53 and the mounting plate 42 to the arrester 1.

At the time of spark discharge in the gap 3, atmospheric pressure therearound increases abruptly. Such abrupt increase of pressure inside the device pushes the movable cover 34 up against the force of the compression spring 35, resulting in a gap between the movable cover 34 and the cover 26. Since this gap communicates with atmosphere through the outer peripheral recess 34*b*, such high inside pressure is reduced.

On the other hand, when the arrester 1 is in abnormal condition, the impedance of the reactor 2 is considerably low because of the grounding current of commercial frequency and therefore the grounding current flows through the reactor 2 to the fusible wire 5. The fusible wire 5 melts down when the grounding current flowing therethrough exceeds a predetermined value. When the melt down of the fusible wire 5 occurs, the trigger 20 is shifted upwardly by the first spring 21. Then, the engagement between the rollers 31 mounted on the end portions of the latch members of the latch 22 and the trigger 20 is broken, making the latch 22 free. In this case, a radial force in a direction from a rotation center of the latch members of the latch 22 acts on the engaged portion of the lower end of the latch 22 and the movable electrode 19 by the second spring 23, so that lower ends of the latch members of the latch 22 rotate toward the fusible wire 5 and thus the engagement is broken, resulting in that the movable electrode 19 drops as shown in FIG. 3.

The movable electrode 19 dropped in this manner rotates, together with the movable conductor 17 connected to the rachet wheel 44, about a center of a rotary shaft 45 until a contact portion 44*a* provided on the rachet wheel 44 abuts the damper 51. Then, the movable electrode 19 may be moved slightly in a reverse direction due to a reaction of the abutment and its weight, or may be held in a position shown by a chain line in FIG. 1 by an engagement thereof with a stop portion 48*a* of the nail 48 or the engaging portion 44*a* of the rachet wheel 44. Thus, the electric circuit between the power transmission side and the arrester side is completely cut out. Further, there is no case where the movable conductor 17 becomes closer to the power transmission line even if wind or rain or vibration of the arm 13 acts thereon.

Although, in the above mentioned embodiment, the moveable conductor 17 swings downwardly, it may be possible to design it such that it swings in a horizontal plane.

Further, although, in the embodiment, the disconnecting device of the arrester for power transmission system is disclosed, the present invention is applicable to any place in which an arrester is used.

As described hereinbefore, according to the present invention, a movable electrode and a trigger is connected in series by means of a fusible wire and an energy of a spring is discharged by the trigger actuated by a melt down of the fusible wire. Therefore, a disconnecting operation of the device from an arrester in malfunction condition is realized without destruction of the device.

What is claimed is:

1. A surge arrester disconnecting device having a reactor, a fusible wire connected in series with said reactor and an air gap provided in parallel to a series circuit of said reactor and said fusible wire and adapted to disconnect a surge arrester connected in series with a parallel circuit of said gap and said series circuit from an electric circuit connecting said arrester to a utilization means, when fault current flows through said arrester, by melt down of said fusible wire, comprising a fixed electrode, a movable electrode, said air gap having a predetermined size and being provided between said fixed electrode and said movable electrode, latch means having one end portion engaged normally with said movable electrode, trigger means engaged normally with the other end portion of said latch means to hold a normal engagement of said one end portion thereof with said movable electrode, said fusible wire being stretched between said movable electrode and said trigger means, first spring means for biasing said trigger means toward a position at which said normal engagement of said one end portion thereof with said movable electrode is broken, said first spring means having a spring force compatible with a tension of said fusible wire, and second spring means normally kept compressed by said movable electrode latched by said latch means to push said movable electrode in a direction in which said movable electrode is separated from said fixed electrode when said movable electrode is unlatched, whereby, when said fusible wire is melted down, said trigger means is actuated by said first spring means to unlatch said movable electrode to allow said second spring means to push said movable electrode in said direction.

2. The arrester disconnecting device as claimed in claim 1, wherein said latch means comprises at least one latch member in the form of a rotatably supported lever having one end for hooking said movable electrode and the other end engaged with said trigger means.

3. The arrester disconnecting device as claimed in claim 1, further comprising a movable conductor having one end on which said movable electrode is fixedly mounted for connecting said movable electrode to said arrester, means mounted on said arrester and supporting the other end of said movable conductor rotatably and means for holding said movable conductor so that said movable electrode is kept separated from said fixed electrode when said movable electrode is unlatched.

4. The arrester disconnecting device as claimed in claim 3, wherein said holding means comprises a nail and a rachet wheel.

* * * * *